June 23, 1964 G. B. DOREY 3,138,116
SLIDING HOPPER CLOSURE OUTLET ASSEMBLY
Filed Dec. 9, 1960 5 Sheets-Sheet 1
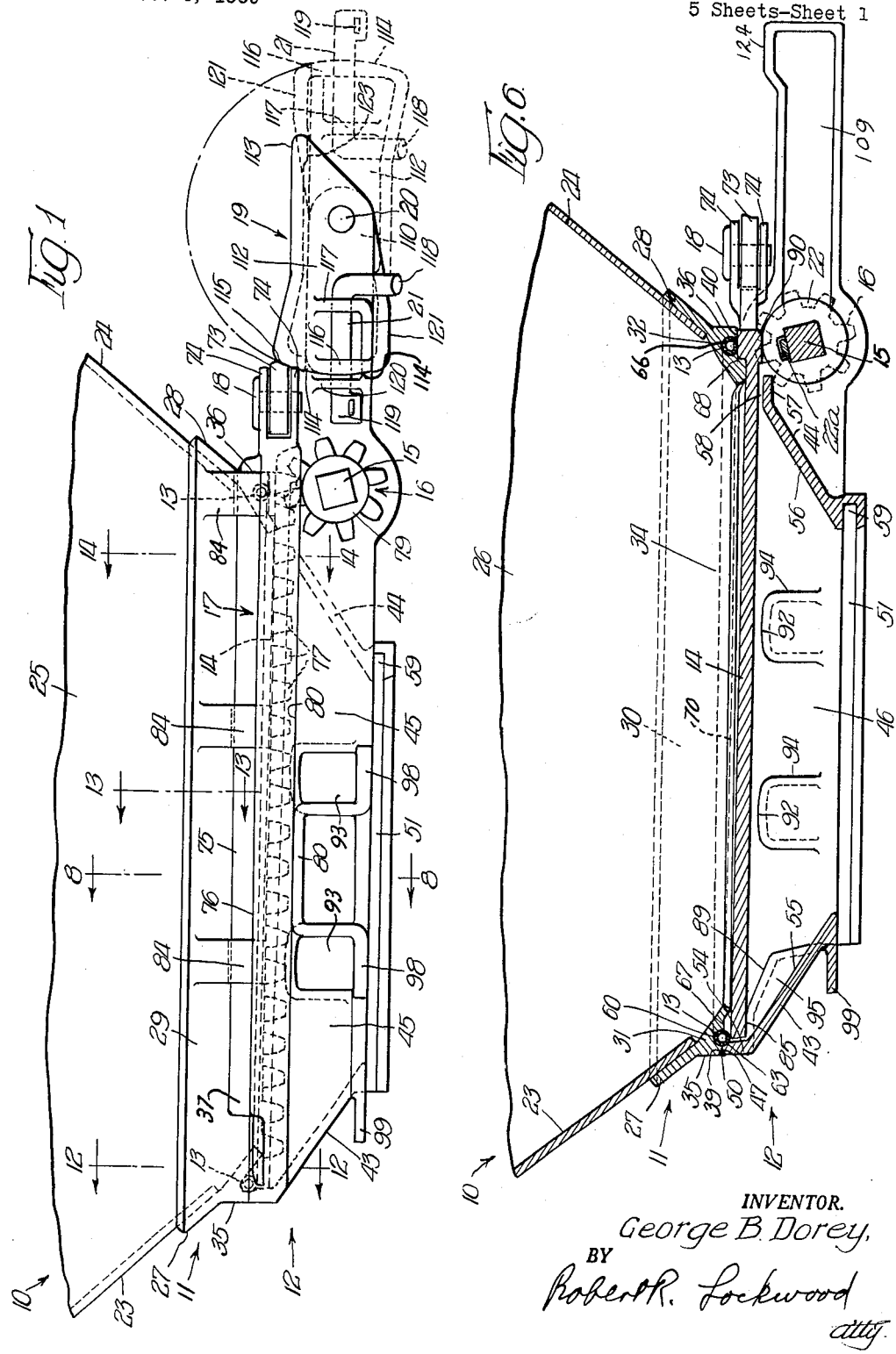
INVENTOR.
George B. Dorey,
BY
Robert R. Lockwood
atty.

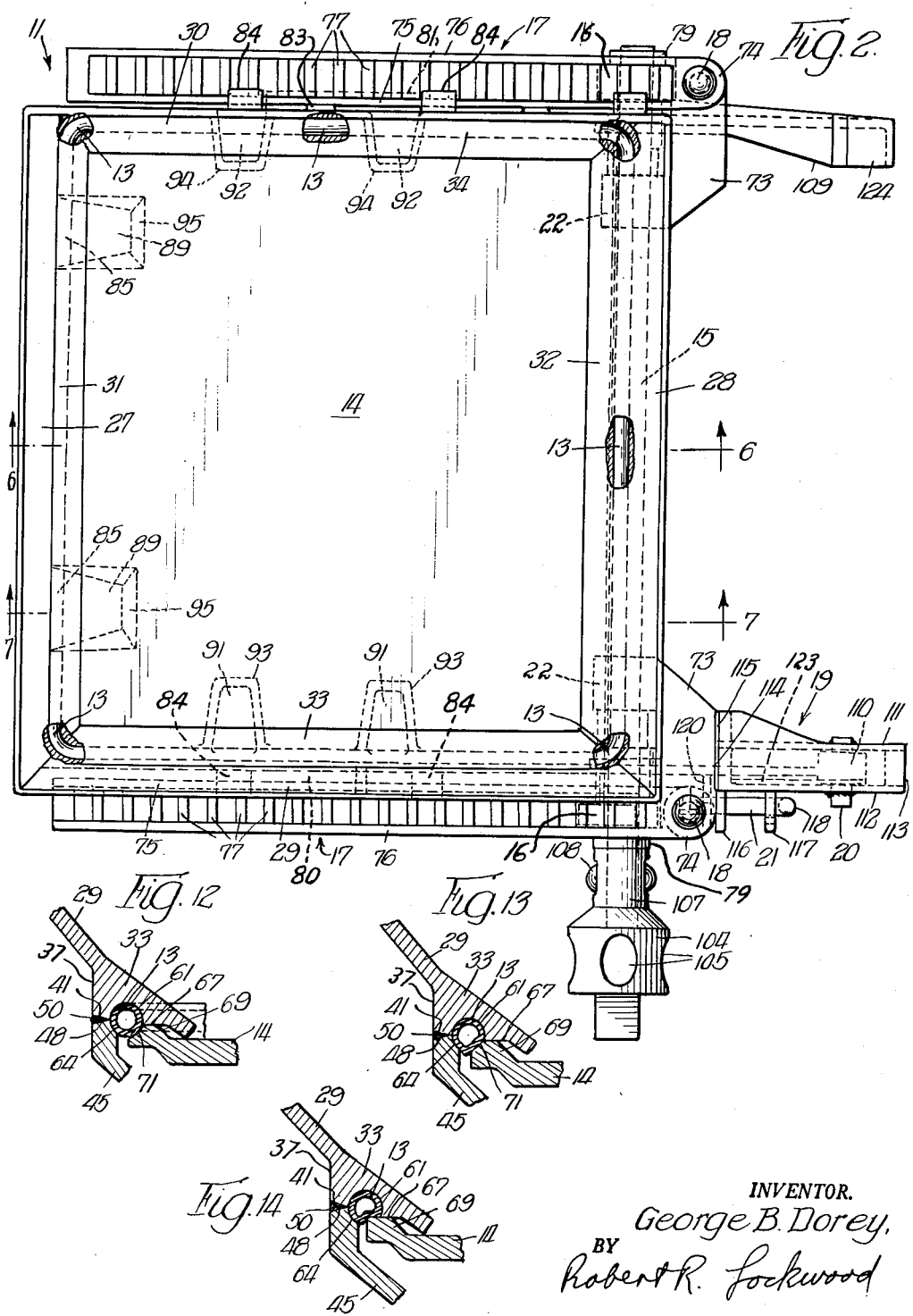

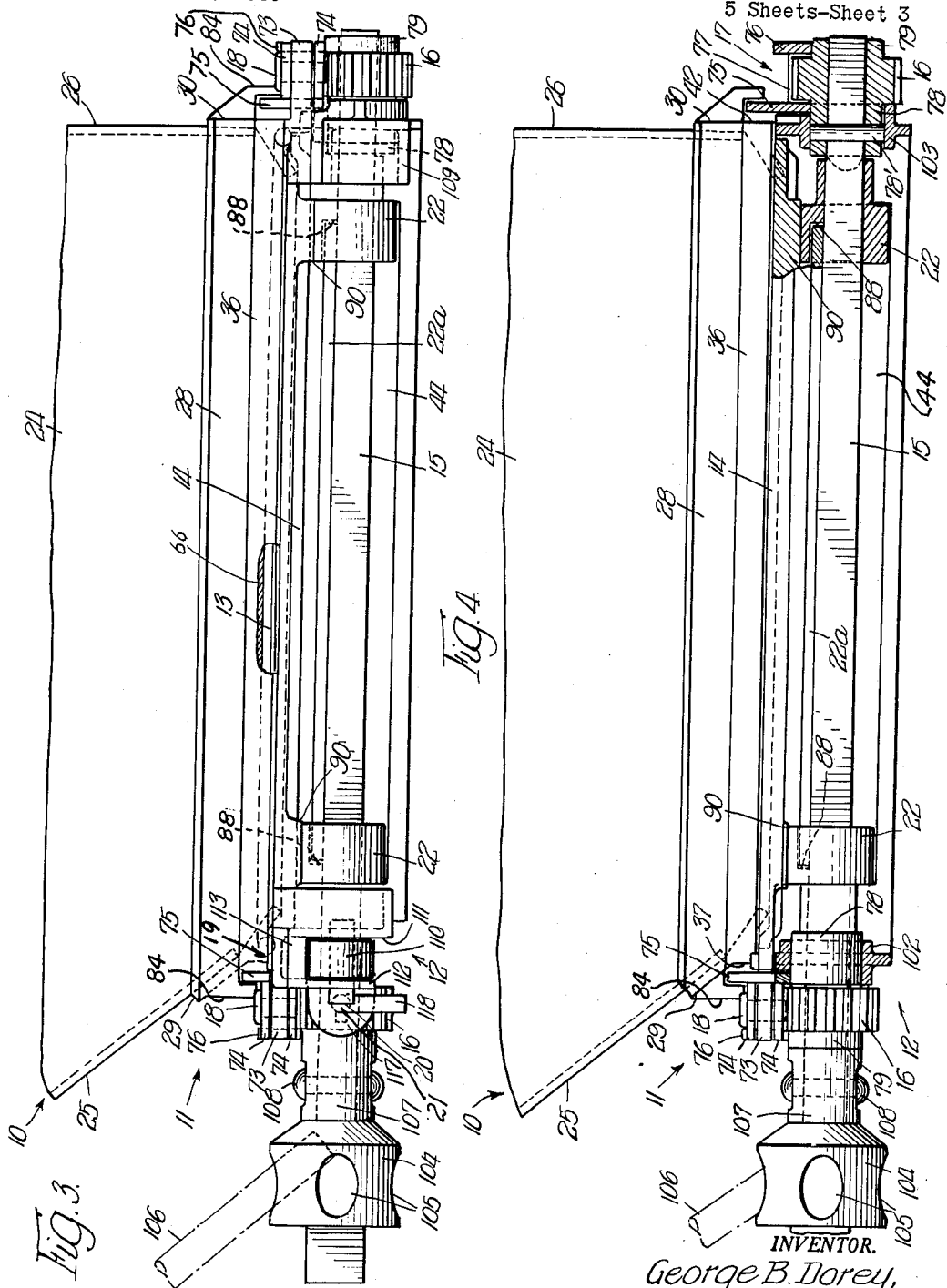

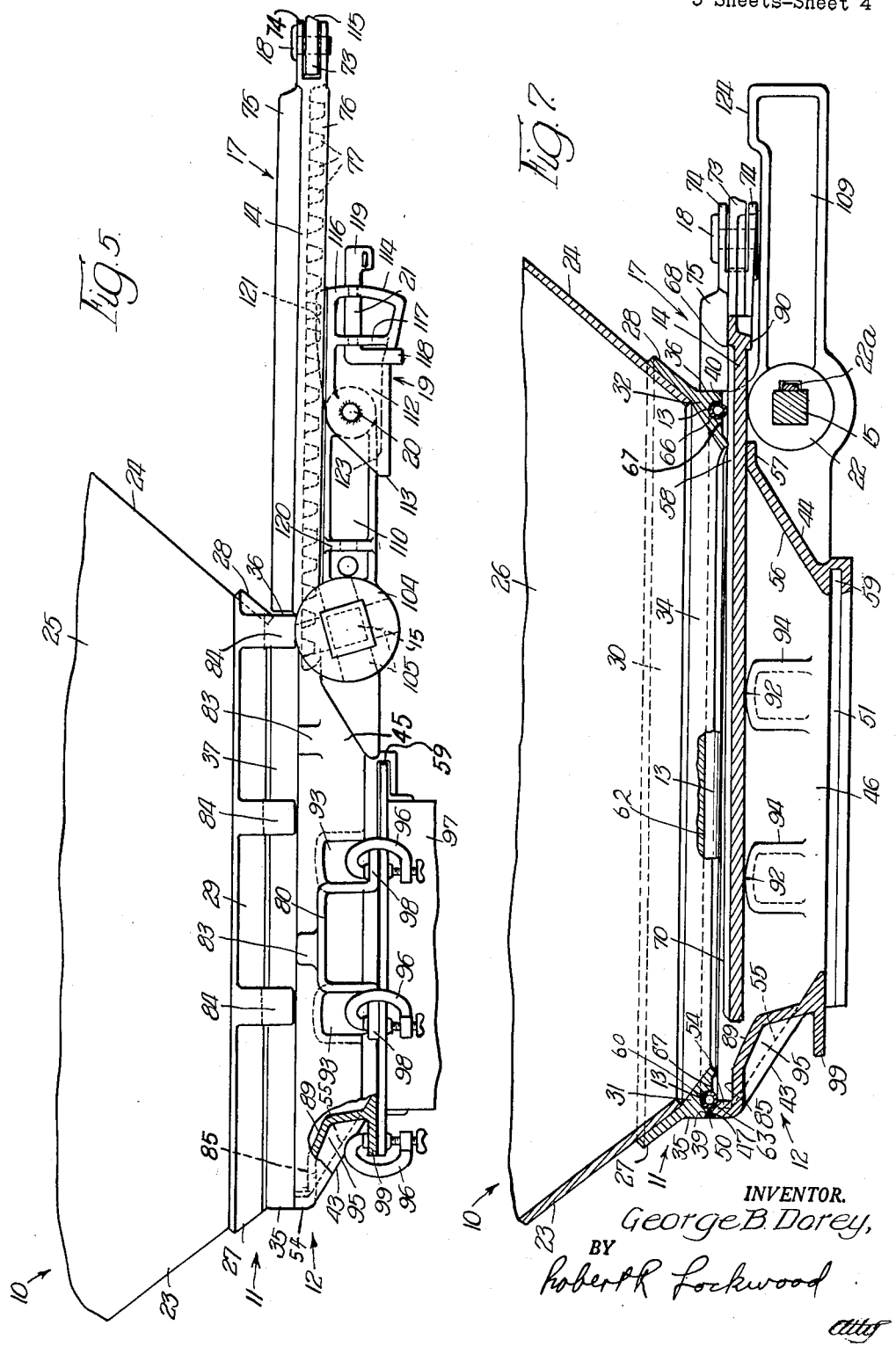

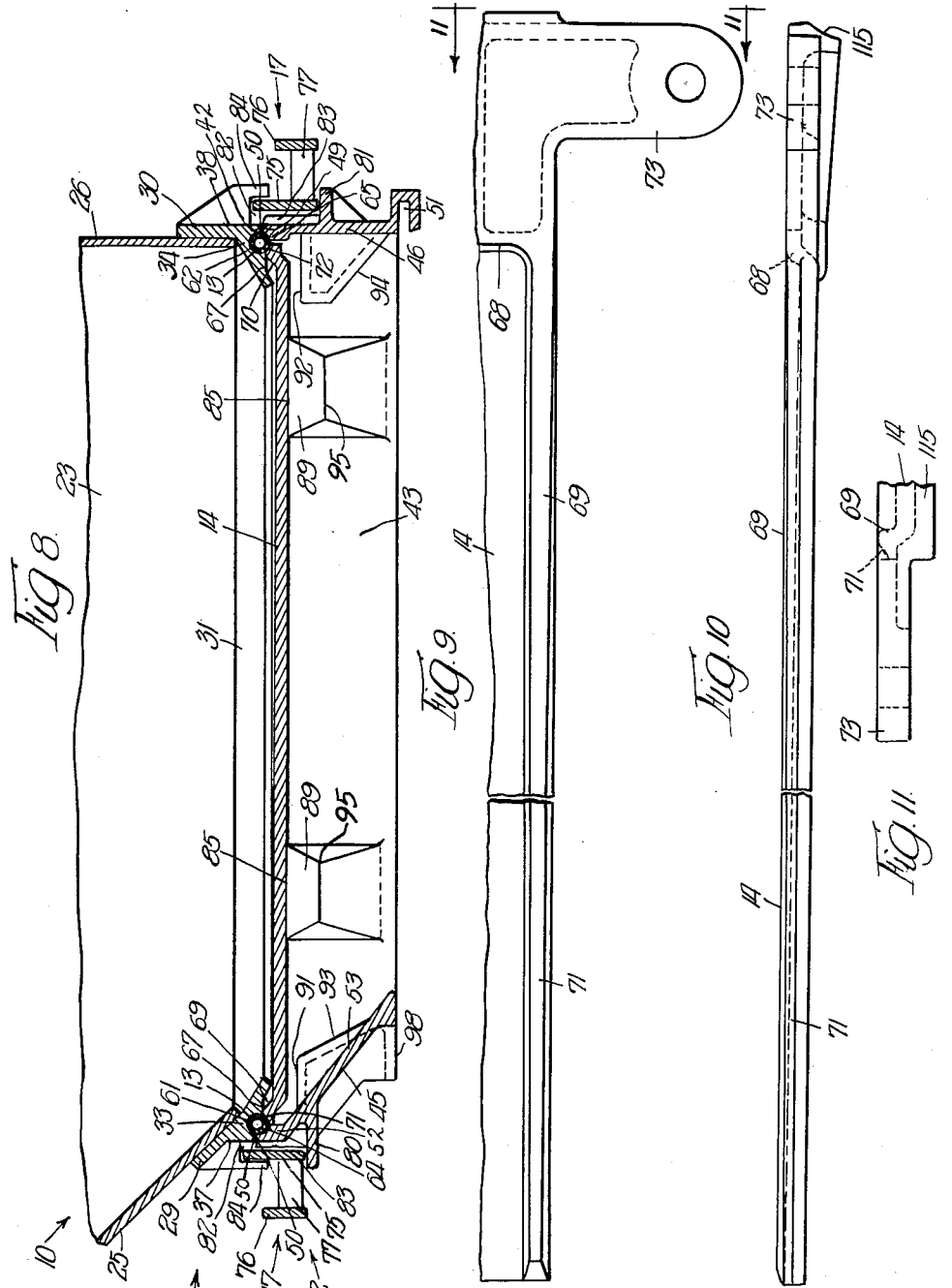

United States Patent Office 3,138,116
Patented June 23, 1964

3,138,116
SLIDING HOPPER CLOSURE OUTLET ASSEMBLY
George B. Dorey, Westmount, Quebec, Canada, assignor to Enterprise Railway Equipment Company, Chicago, Ill., a corporation of Illinois
Filed Dec. 9, 1960, Ser. No. 74,878
3 Claims. (Cl. 105—253)

This invention relates to an improved outlet structure for a load containing hopper and relates more particularly to that type of outlet commonly used for railway hopper cars and the like.

The improvement relates more particularly to an outlet structure having a movable gate for closing a discharge opening and has for one of its objects the attainment of an assembly combining ease of operation with sealing features for the prevention of leakage and entrance of moisture.

The method of providing sealing security in outlets of the identified type has heretofore been largely confined to a system depending upon the weight of the gate and lading to maintain close fitting contact with the ways upon which the gate rests and moves. Such a construction necessarily requires dragging of the gate on the supporting surface and is accompanied by a frictional resistance rendering the opening operation slow and arduous. Moreover, such a dragging movement of the gate often results in the scoring of the bearing surfaces and supporting ways.

It is therefore an object of the present improvement to overcome the limitations inherent in the conventional structures, as above outlined, by providing antifriction supporting means for assuring a rollaway opening movement of the gate. The improvement further contemplates improved sealing features between the gate and supporting frame whereby resilient sealing surfaces are employed to function with metallic surfaces and thus complement each other.

Another specific object of the invention is to provide a pivotally mounted latching element which, in one position, will function as a latching member for maintaining the gate in closed position and be swingable to another position for acting as a support for the gate in opened position.

The invention further resides in details of construction concerned with the gate and its supporting frame structure and in its relation with the gate and operating mechanism and in the mounting and relation of rotatable bearing surfaces on an operating shaft.

The invention in its preferred form contemplates the fabrication of a frame assembly in two main sections including upper and lower sections with a resilient gasket interposed therebetween for coacting with the gate.

For further comprehension of the invention reference may be had to the accompanying drawings wherein:

FIG. 1 is a side elevational view of the lower portion of a hopper, such as employed in railway hopper cars and the like, with the improved structure applied thereto, said view showing the gate in closed and latched position and with the shaft operating head eliminated to better illustrate the parts.

FIG. 2 is a plan view of the structure shown in FIG. 1 with the hopper floor sheets eliminated and certain parts broken away to show the gasket.

FIG. 3 is an elevational view of FIG. 1, as viewed from right to left, with a broken away portion to show the gasket.

FIG. 4 is an end elevational view similar to FIG. 3 except that the locking element with its associated sealing pin is eliminated and the other parts are broken away to better illustrate the construction.

FIG. 5 is a side elevational view similar to FIG. 1 except that the gate is shown in fully opened position and a removable extension chute is shown with attaching clamps.

FIG. 6 is a vertical longitudinal sectional view taken on a line 6—6 of FIG. 2.

FIG. 7 is a vertical longitudinal sectional view taken on a line 7—7 of FIG. 2 showing the gate partly open and in the lowered position.

FIG. 8 is a vertical transverse sectional view taken on a line 8—8 of FIG. 1.

FIG. 9 is a fractional longitudinal top plan view of one side portion of the gate.

FIG. 10 is a side elevational view of the construction shown in FIG. 9.

FIG. 11 is an end elevational view taken along line 11—11 of FIG. 9.

FIG. 12 is a fractional sectional view taken through the gate and gasket on line 12—12 of FIG. 1.

FIG. 13 is a view, similar to FIG. 12, except that it is taken on a line 13—13 of FIG. 1.

FIG. 14 is a view, similar to FIGS. 12 and 13, except taken on a line 14—14 of FIG. 1.

In said drawings the improvement, which is shown as applied to a four sided hopper 10, includes a frame composed of upper and lower sections as indicated at 11 and 12 respectively. A tubular shaped resilient gasket 13 of rubber or rubber like material is interposed between said upper and lower frame sections and engageable therewith is a sliding gate 14. The gate 14 is moved by a rotatable shaft 15 through the medium of gear means in the form of pinions 16 on the shaft 15 having engagement with toothed rack means 17 connected to the gate by pintles 18.

The gate 14 is positively maintained in closed position by a swingable element 19 pivotally mounted on a pintle 20. The element 19 in one position forms a locking dog for the gate 14 (FIG. 1) and is swingable to another position to underlie the gate (FIG. 5) and form a support therefor when in open position. A sealing pin 21, carried by the element 19, secures the latter in locking position.

The gate 14, throughout a substantial extent of its longitudinal movement, rides on rotatable seats or rollers 22—22 which are non-rotatably mounted on the shaft 15 and are maintained against inward axial movement by a spacer bar 22a.

The hopper 10 is defined, in part, by oppositely sloping transversely extending walls 23 and 24 which meet with longitudinally extending walls 25 and 26.

The upper frame section 11 includes walls 27, 28, 29 and 30, which, respectively, overlie the walls 23, 24, 25 and 26 of the hopper 10 and extend downwardly to merge into triangular shaped bulbous sections 31, 32, 33 and 34 having inclined inner lading shedding surfaces. The said triangular shaped bulbous sections have vertically extending outer surfaces 35, 36, 37 and 38 and lower marginal edges 39, 40, 41 and 42.

The lower frame section 12 is in the form of a funnel like enclosure formed of four walls 43, 44, 45 and 46 with the three walls 43, 45 and 46 disposed with their upper edges 47, 48 and 49 registering with the edges 39, 41 and 42 respectively and welded thereto as indicated at 50, thereby forming a well integrated structure.

The wall 46, FIG. 8, extends vertically with its lower margin reinforced by a groove 51 and the oppositely facing side 45 includes an upper vertically extending wall 52 leading to an inwardly downwardly inclined lading shedding wall 53. The transversely extending end wall 43 likewise includes an upper vertically extending wall section 54 leading downwardly to an inwardly inclined wall 55.

The end wall 44, FIG. 7, extends transversely beneath the gate 14 and includes a sloping wall 56 having an upper flange 57 underlying the gate 14 and in combination with the lower edge wall 40 of wall 28 forms a slotted opening 58 for the passage of the gate 14 therethrough. The lower margin of the sloping wall 56 includes a groove 59 forming a continuation of groove 51 of the wall 46.

The triangular shaped members 31, 33 and 34 of the upper frame section 11 are recessed on their underside, as indicated at 60, 61 and 62, in combination with concave shaped surfaces 63, 64 and 65 of the lower frame section 12 form housings for the accommodation of the resilient gasket 13.

A recess 66, FIG. 7, in the triangular shaped enlargement 32 of the overlying wall 28 receives and holds the gasket 13 therein by reason of the access aperture leading thereto being of such restricted width as to compel deformation of the gasket during insertion. Adjacent the gasket 13 on the underside of each of the sections 31, 32, 33 and 34 there are flat surfaces 67.

The gasket 13 is preferably in the form of a continuous ring and there is thus provided an uninterrupted sealing surface around the opening through the frame sections 11 and 12. The gate 14 is flanged upwardly on three sides, as indicated at 68, 69 and 70, with the flange 68 extending transversely of the gate at its trailing end. The flanges 69 and 70 extend longitudinally and taper from the trailing to the leading edge of the gate 14. The inner side edge portions of the side flanges 69 and 70 are adapted to have sealing relation with the flat surfaces 67 and outwardly of said sealing portions the side flanges 69 and 70 are beveled to slope outwardly and downwardly as seen at 71 and 72, FIG. 8, to impinge on the gasket 13.

The projecting portion of the gate 14 is provided with laterally extending brackets 73—73 which are straddled by jaws 74—74 of the rack bars 17 and connected therewith by the pintles 18. The rack bars 17, which extend lengthwise at each side of the frame sections 11 and 12, are preferably formed of walls 75 and 76 spaced apart and transversely united by a series of gear teeth 77. The walls 75 and 76 straddle the pinions 16 to rest on hubs 78 and 79 of the pinions 16 and are thereby supported. The rack bars 17 are further supported by laterally extending shelves 80 and 81 which form seats for the inner walls 75. The inner walls 75 of the rack bars 17 extend upwardly above the level of the companion outer walls 76 to move in a series of grooves 82 formed by raised pads 83 and lugs 84.

The gate 14, in its closed position, seats at its leading end on a pair of seats 85—85 and at its trailing end is supported by the pair of seats 22—22 which, as described, are in the form of circular sleeves non-rotatably mounted on the shaft 15. The seats or sleeves 22—22 are maintained in axial relation on the shaft 15 by the spacer bar 22a which extends within the sleeves to abut end walls 88.

The gate 14, when in closed position, is preferably inclined upwardly from its trailing end to dispose the upper edges of the side flanges 69 and 70 along a substantially horizontal plane and compress juxtaposed portions of the gasket 13. Compression of the gasket 13 is effected by a lifting movement of the gate 14 and is carried out towards the end of the closing operation.

Vertical movement of the gate 14 is effected at the leading end by a sliding movement on inclined runways 89 leading to the seats 85. At the trailing end there are provided raised pads 90 on the underside of the gate 14 which operate to lift the latter as the end of the closing movement approaches. The gate 14, in its closed position, FIG. 6, thus rests at its leading end on the seats 85 and at its trailing end rests on the roller like seats 22—22. To support the gate 14 in its lowered position, intermediate bearing seats 91—91 and 92—92 are provided. The bearing seats 91 and 92 preferably are of arcuate contour, FIG. 7, curving in the direction of the movement of the gate 14, to allow for tilting of the gate in its movement.

The bearing surfaces 91—91 and 92—92 constitute the upper walls or roofs of housings 93—93 and 94—94 formed by bulges in the side walls 45 and 46. Similarly the bearing seats 85—85 and inclined approaches 88—88 leading thereto constitute the roofs of housings 95—95 formed by bulges in the end wall 43.

The housings 93—93 and 95—95 provide open sided enclosures in the frame walls 45 and 43 for the accommodation of C-clamps 96—96 (FIG. 5) whereby a removable extension chute 97 is retained in place on two adjacent sides of the lower frame section 12 and to this end clamping flanges 98 and 99 are disposed in alignment with the lower part of the housings 93 and 95. It will be understood that the other two adjacent sides of the chute 97 are received and held in the grooves 50 and 51.

The shaft 15, FIG. 4, is preferably of non-circular cross section and the inwardly extending hubs 78—78 from the pinions 16—16 are rotatable in bearings 102 and 103 formed integrally with the side walls 45 and 46 of the lower frame structure 12. A headless pin 78′ extends through one of the hubs 78 and the shaft 15 to hold the assembly in place. An operating head 104, having therein a plurality of socket openings 105 for the reception of an operating bar 106, has a sleeve portion 107 telescoped over the shaft 15 and is secured thereto by a rivet 108.

Extension brackets are provided for supporting the gate 14 in opened position, as indicated at 109 and 110, the latter having the combination latching and support element 19 pivotally mounted thereon.

The element 19 includes spaced apart walls 111 and 112 united by a transverse wall 113 and straddles the extension 110, being pivotally mounted at the end thereto by the pintle 20. Interconnecting the other ends of the walls 111 and 112 is an arcuate flange 114 which engages with abutment face 115 on the bracket 73 of the gate 14 to retain the latter in closed position. The outer wall 112 includes outstanding walls 116 and 117 through which the sealing pin 21 slidably extends, said pin 21 being provided at one end with a handle 118 and at the opposite end having a key shaped section 119 perforated to receive a sealing ribbon. The key shaped end 119 is adapted to extend through a laterally extending vertical wall 120 on the extension 110. The pintle 20 is extended outwardly to form a limiting stop for the pin 21.

The element 19, as will be observed by reference to FIGS. 1 and 5, is adapted to be swung to underlie the gate 14 in opened position and includes a section 121 adapted to form a seat for the gate 14. It is retained in the gate supporting position by an abutment 123 on the transverse wall 113 which engages the underside of the extension 110. The extension bracket 109 likewise is provided with a seat 124 on which the gate 14 is adapted to slide.

The operation and advantages of the improvement may be best understood by following the sequence of movements involved in one cycle of opening and closing the gate, as follows:

Assuming the gate 14 is in closed and locked position, as seen in FIG. 1, the opening thereof is carried out by first releasing the sealing pin 21 and swinging the latching element 19 to form a support for the gate as indicated by conventional dot and dash lines in FIG. 1 and by full lines in FIG. 5. The operating bar 106 is then inserted in one of the sockets 105 of the operating head 104 and rotation thereof is effected in a clockwise direction, the gate 14 is withdrawn from its seating relation on seats 85—85, FIG. 6, and simultaneously the support at trailing end of the gate is transferred from the raised pads 90 to the undersurface of the gate 14 thereby causing it to move downwardly and away from the gasket 13 as seen in FIG. 7.

The fact that the weight of the gate 14 and lading is partly supported by the rotatable seats 22—22 during the early stage of the opening operation is conducive to an easy breakaway of the gate 14 and facilitates the opening operation for an appreciable length of travel and this at the time when the lading weight is heaviest.

The closing operation of the gate 14 is a reversal of the opening movement, the gate 14 moving throughout its major extent of travel out of contact with the gasket 13. As the gate 14 approaches the completion of the closing movement and is lifted to final closed position with a slight upward inclination, it contacts the gasket 13 at varying angles as indicated by FIGS. 12, 13 and 14.

What is claimed as new is:

1. In combination, a hopper having a discharge opening and a sliding gate for the opening; means for supporting the gate in its sliding movement including side wall members lying at opposite sides of the gate and extending below the level of said gate, certain of said side walls having bulges formed therein to extend inwardly beneath the gate and form supports on which the gate is adapted to slide, said bulges forming open sided enclosures with the open sides facing outwardly of the respective side walls.

2. In combination, a hopper having a discharge opening and a sliding gate for the opening; means for supporting the gate in its sliding movement including side wall members lying at opposite sides of the gate and extending below the level of said gate, certain of said side walls having bulges formed therein to extend inwardly beneath the gate and form seats on which the gate is adapted to slide, said seats being of convex shape curved in the general direction of movement of the gate, the walls of said bulges being continuations of the respective side walls and forming open sided enclosures with the open sides facing outwardly of said side walls.

3. In combination, a four-sided hopper having a discharge opening and a sliding gate for the opening, a frame surrounding the hopper including an upper section disposed above the gate and a lower section including walls extending downwardly below the level of the gate forming a three-sided enclosure comprising side walls and an intermediate wall within which the gate extends, certain of said walls of the three sides of the enclosure including inwardly extending bulges having upper walls forming seats for the gate, the walls of said bulges being continuations of the respective sides of said three-sided enclosure and forming open sided enclosures with the open side facing outwardly of said side walls, those portions of the walls of the bulges forming the seat for the gate on the intermediate wall being at a higher elevation than the corresponding portions of the walls of the bulges on said side walls.

References Cited in the file of this patent

UNITED STATES PATENTS

| | | |
|---|---|---|
| 935,050 | Otis | Sept. 28, 1909 |
| 949,494 | Otis | Feb. 15, 1910 |
| 1,153,249 | Parke | Sept. 14, 1915 |
| 2,386,702 | McBride | Oct. 9, 1945 |
| 2,738,735 | Zimmer | Mar. 20, 1956 |
| 2,738,739 | Dorey | Mar. 20, 1956 |
| 2,749,851 | Dorey | June 12, 1956 |
| 2,810,356 | Dath | Oct. 22, 1957 |
| 2,863,402 | Ford | Dec. 9, 1958 |